UNITED STATES PATENT OFFICE.

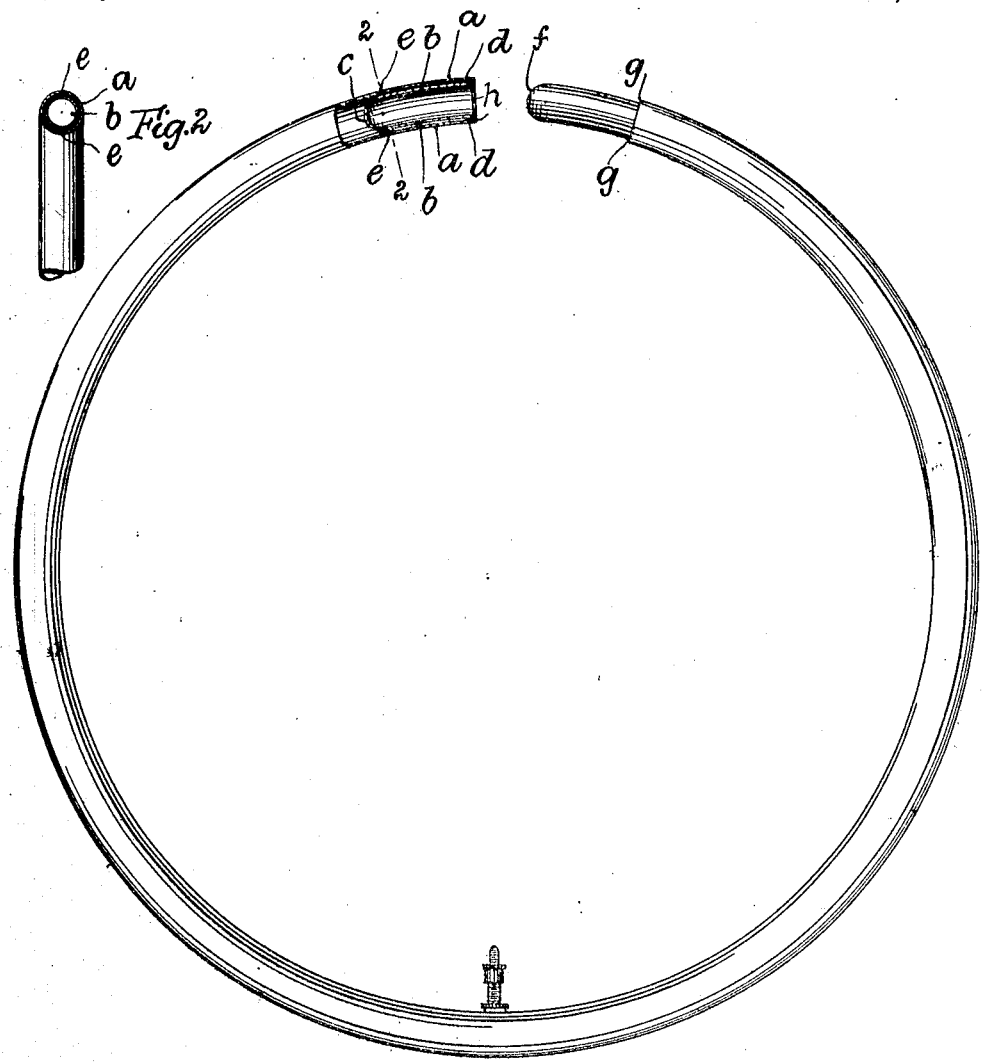
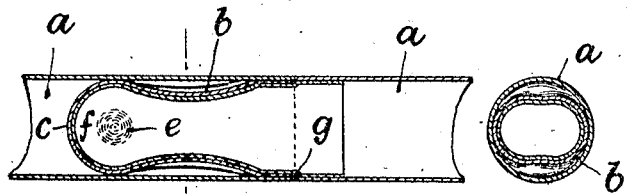

JAMES REES, OF CARDIFF, ENGLAND.

AIR-TUBE OF TIRES.

No. 913,850.  Specification of Letters Patent.  Patented March 2, 1909.

Application filed March 30, 1908. Serial No. 424,173.

*To all whom it may concern:*

Be it known that I, JAMES REES, a subject of the King of Great Britain, residing at No. 61 Alfred street, Roath Park, Cardiff, South Wales, England, have invented new and useful Improvements in Air-Tubes of Tires, of which the following is a specification.

This invention relates to improvements in air tubes for pneumatic tires, of the type in which the tube instead of being endless is discontinuous, the two ends when in the operative position, being united by a plug and socket joint, the plug element of which is formed by cementing a relatively short length of tubing so as to project from one of the ends of the air tube, the outer end of such projecting length being closed, and the socket element being formed by another short length of tubing contained entirely within the other end of the air tube, the inner end of such length of tubing being closed. Hitherto with this type of jointed air tube, the short length of tubing which forms the socket has either been cemented through its entire length within the end of the air tube or, in those cases in which air has had access to the space between the tube and the socket for the purpose of locking the plug and socket together, the desired object has been defeated by the pressure on the closed end of the socket causing it to turn inside out thereby effecting disconnection of the joint by the ejection of the plug.

By the present invention the interlocking is promoted by the distorting effect due to the action of means for preventing the inversion of the socket.

For effecting the above purpose by the present invention, the closed ended socket is cemented within one end of the air tube throughout the entire circumference of its extremity, and at the inner closed end the socket is cemented to the interior surface of the air tube at one or more discontinuous places, preferably two diametrically opposite places, thereby permitting free access of air to the space between the interior surface of the tube and the exterior surface of the socket.

An air tube constructed according to my invention is illustrated in the accompanying drawing in which:—

Figure 1 is a side elevation, Fig. 2 is a section taken along the line 2—2 of Fig. 1, and—Figs. 3 and 4 are longitudinal and transverse sections respectively, showing the joint in the operative position and drawn to a larger scale.

In this drawing:—$a$ is the discontinuous air tube, the plug element of the joint of which projects from $f$ to $g$, the plug being a short length of tubing cemented in the end $g$ of the air tube and projecting therefrom terminating in a hemispherical closed end $f$. The socket element of the joint is formed by a short length of tubing $b$ which is contained within the other end of the air tube $a$. The socket $b$ is provided with a hemispherical closed inner end $c$, and is cemented at each end of its length within the end of the air tube at $d$ and $e$ respectively.

At $d$ which is at the mouth $h$ of the end of the air tube, the socket tubing $b$ is cemented throughout its entire circumference to the interior surface of the air tube, whereas at $e$ it is cemented at two diametrically opposite places only, so permitting air to pass the joint $e$ and have access to the space between the air tube and socket.

By reference to Figs. 3 and 4, it will be seen that after insertion of the plug into the socket and inflation of the air tube on attempted withdrawal of the plug from the socket, the walls of the plug and socket will become distorted so as to assume a flattened section owing to the access of air under pressure to the space between the air tube and the socket and within the plug causing the plug and socket to cling together and the local attachment of the inner end of the socket to the interior of the air tube locally resisting inversion of the socket, such distortion from the cylindrical or prismatic form of the mutually interfitting plug and socket will prevent disconnection of the ends of the air tube by endwise displacement.

I claim:

1. In a discontinuous air tube for tires, a plug end of uniform diameter provided with a hemispherical closed end and a socket end, said socket comprising a short length of tubing secured in an air-tight manner at its outer end throughout its entire circumference to the interior surface of the air tube and secured at its closed inner end at a portion only of its circumference to the interior surface of the air tube.

2. In a discontinuous air tube for tires, a plug end of uniform diameter provided with a hemispherical closed end and a socket end, said socket comprising a short length of tubing cemented at its outer end throughout its circumference to the interior surface of the air tube and cemented at its closed inner end at two diametrically opposite places only to the interior surface of the air tube.

In testimony whereof I have signed my name to this specification in the presence of two subscribing witnesses.

JAMES REES.

Witnesses:
 BESSIE L. ADAMS,
 MORGAN ROWLANDS.